(12) United States Patent
Spencer et al.

(10) Patent No.: US 9,172,175 B2
(45) Date of Patent: Oct. 27, 2015

(54) UNDERWATER ELECTRICAL CONNECTION AND TERMINATION ASSEMBLIES

(71) Applicant: Siemens Aktiengesellschaft, Munich (DE)

(72) Inventors: Scott Robert Spencer, Walney (GB); James Stuart McIntosh, Littleport (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 183 days.

(21) Appl. No.: 13/891,151

(22) Filed: May 9, 2013

(65) Prior Publication Data

US 2013/0309896 A1   Nov. 21, 2013

Related U.S. Application Data

(60) Provisional application No. 61/646,964, filed on May 15, 2012.

(51) Int. Cl.
*H01R 13/52* (2006.01)
*H01R 13/58* (2006.01)
(Continued)

(52) U.S. Cl.
CPC .............. *H01R 13/58* (2013.01); *H01R 13/523* (2013.01); *H02G 15/06* (2013.01); *H01R 2101/00* (2013.01)

(58) Field of Classification Search
CPC ............................ H01R 13/52; H01R 13/523
USPC ......... 439/184, 201, 271, 521, 675, 276, 273, 439/199, 205, 206, 587, 604; 385/56
See application file for complete search history.

(56) References Cited

U.S. PATENT DOCUMENTS

| | | | |
|---|---|---|---|
| 3,148,011 A | 9/1964 | Brown | 439/279 |
| 3,670,287 A | 6/1972 | Keto | 439/39 |

(Continued)

FOREIGN PATENT DOCUMENTS

| | | | | |
|---|---|---|---|---|
| EP | 0048601 A2 | 3/1982 | | H01P 1/04 |
| EP | 0124987 A2 | 11/1984 | | G02B 6/24 |

(Continued)

OTHER PUBLICATIONS

Great Britain Search Report, Application No. 1208535.3, 3 pages, Sep. 14, 2012.

(Continued)

*Primary Examiner* — Amy Cohen Johnson
*Assistant Examiner* — Milagros Jeancharles
(74) *Attorney, Agent, or Firm* — Slayden Grubert Beard PLLC

(57) ABSTRACT

An underwater electrical connection assembly may include a contact pin including an axially extending conductive core and an axially extending annular insulation portion around said conductive core, a front end portion of the conductive core having an electrical contact surface, a rear end portion of the conductive core having an electrical contact surface, and an intermediate portion of the conductive core extending axially at an intermediate location between the front and rear end portions, wherein the rear end portion of the conductive core of the pin has a diameter larger than the diameter of the intermediate portion thereof, and wherein the annular insulation portion includes an inner insulating layer around the intermediate portion of the conductive core and an insulating sleeve around the inner insulating layer.

27 Claims, 6 Drawing Sheets

(51) Int. Cl.
*H01R 13/523* (2006.01)
*H02G 15/06* (2006.01)
*H01R 101/00* (2006.01)

(56) References Cited

U.S. PATENT DOCUMENTS

| | | | |
|---|---|---|---|
| 3,957,332 A | 5/1976 | Lambert, III | 439/38 |
| 4,039,242 A | 8/1977 | Wilson et al. | 439/188 |
| 4,699,353 A * | 10/1987 | Weyer | 251/60 |
| 4,860,965 A * | 8/1989 | Hodgetts | 254/342 |
| 5,092,784 A | 3/1992 | De Mendez et al. | 439/161 |
| 5,277,605 A * | 1/1994 | Roscizewski et al. | 439/184 |
| 5,645,442 A * | 7/1997 | Cairns | 439/201 |
| 6,315,461 B1 * | 11/2001 | Cairns | 385/56 |
| 6,561,714 B1 * | 5/2003 | Williams et al. | 403/2 |
| 7,534,147 B2 * | 5/2009 | Marklove et al. | 439/675 |
| 7,690,936 B1 | 4/2010 | Snekkevik et al. | 439/281 |
| 7,794,254 B2 * | 9/2010 | Marklove et al. | 439/271 |
| 7,959,454 B2 * | 6/2011 | Ramasubramanian et al. | 439/201 |
| 2005/0042903 A1 * | 2/2005 | Nicholson | 439/201 |
| 2005/0112942 A1 | 5/2005 | Shah | 439/589 |
| 2008/0274636 A1 | 11/2008 | Marklove et al. | 439/271 |
| 2010/0035452 A1 | 2/2010 | Mudge, III et al. | 439/271 |
| 2011/0021049 A1 | 1/2011 | Ramasubramanian et al. | 439/201 |
| 2011/0034066 A1 | 2/2011 | Jazowski et al. | 439/426 |
| 2011/0187097 A1 * | 8/2011 | Villa | 285/368 |
| 2014/0024250 A1 * | 1/2014 | Spencer et al. | 439/521 |

FOREIGN PATENT DOCUMENTS

| | | | |
|---|---|---|---|
| EP | 0462879 A1 | 12/1991 | H01R 4/01 |
| GB | 2192316 A | 1/1988 | H01R 13/523 |
| GB | 2361365 A | 10/2001 | H01R 13/523 |
| GB | 2434698 A | 8/2007 | H01B 17/30 |

OTHER PUBLICATIONS

Great Britain Search Report, Application No. 1208540.3, 3 pages, Sep. 14, 2012.
International Search Report and Written Opinion, Application No. PCT/EP2013/058991, 12 pages, Jul. 4, 2013.
European Search Report, Application No. 13165958.3, 8 pages, Aug. 13, 2013.

* cited by examiner

UNDERWATER ELECTRICAL CONNECTION AND TERMINATION ASSEMBLIES

CROSS-REFERENCE TO RELATED APPLICATIONS

This application claims the benefit of U.S. Provisional Patent Application No. 61/646,964 filed May 15, 2012. The contents of which is incorporated herein by reference in its entirety.

TECHNICAL FIELD

This disclosure relates to underwater electrical connection assemblies and to termination assemblies for underwater cables.

BACKGROUND

Underwater electrical connection assemblies are known and have been in widespread use in the offshore oil and gas industry for many years. An example is shown in GB 2192316 A, which discloses an underwater connector with a first connector part and a second connector part which are capable of being mated and de-mated underwater. In this known design the first connector half comprises a receptacle for receiving a plug of a second connector half. An electrical contact pin projects axially in the receptacle and when the plug is inserted in the receptacle the pin enters the plug to make an electrical connection with a contact socket inside the plug. The electrical connection is established in a protected oil or gel filled environment contained in a chamber which is pressure balanced with respect to the pressure outside of the connector, thereby reducing the tendency for water or contaminants to enter the connection chamber.

Underwater electrical connectors are used for communicating electric signals for instrumentation and also for electric power applications. In recent years there has been a demand for connector assemblies capable of handling high voltages, typically tens of kilovolts. An example of a high voltage underwater electrical connector is described in GB 2361365 A. The use of high voltages creates issues concerning the electric field around the live components, and the electric stress created in insulating components in the case of high electric field gradients. Insulating materials can suffer from breakdown of the materials above a critical level of electric field gradient. The drawing of high currents through the connector raises issues about heating and it is desirable to avoid hot spots which can lead to reduced efficiency and possible material degradation or even failure.

A known high voltage connector assembly is the SpecTRON (trade mark) produced by Expro Connectors and Measurements of the United Kingdom. The electrical contact pin of the receptacle connector half has an axially extending conductive core and an axially extending annular insulation portion around the axially extending conductive core. The rear end portion of the conductive core has a radially outwardly facing electrical contact surface, for connection to another component to the rear of the connector, such as an underwater cable. The front end portion of the conductive core also has a radially outwardly facing electrical contact surface, in this case for making contact with a socket provided in the plug connector half. The contact pin projects forwardly from a support and when the connector halves are fully mated the base part of the contact pin, nearest the support, extends through a seal provided at the entry to the plug connector half. In the region of this base part the contact pin has an electrically conductive earth shield arranged radially outwardly of the annular insulation portion. This earth shield serves to shield the seal at the entry to the plug connector half from electrical stress. In the mated condition of the connector assembly the base part of the pin immediately adjacent to the support is exposed to the surrounding water, and the earth shield can therefore also serve to protect the annular insulation portion from the effects of ambient water, and thus avoids water absorption that often leads to electrical degradation or failure. It also provides verification testing advantages, because the earth profile is not dependent on the ambient water i.e. it is independent of the environment.

A certain minimum thickness is required for the annular insulation portion between the conductive core and the earth shield, to avoid excessively high electrical stresses in the insulation material. The outside diameter of the earth shield is the same as the outside diameter of the insulation portion forwardly thereof, so that the contact pin has a constant diameter along all of its length which is to be inserted in the entry seal of the plug connector half. In order to comply with these constraints, for a given overall diameter of the contact pin, there is a maximum diameter imposed on the conductive core where it passes through the earth shield.

During construction of this known connector assembly, the annular insulation portion is provided by an insulating sleeve which is inserted over the conductive core from the rear. The rear end portion of the conductive core, where the radially outwardly facing electrical contact surface is provided, therefore has the same diameter as the part of the core which passes through the conductive earth shield.

SUMMARY

One embodiment provides an underwater electrical connection assembly comprising a contact pin comprising an axially extending conductive core and an axially extending annular insulation portion around said conductive core, a front end portion of the conductive core having an electrical contact surface, a rear end portion of the conductive core having an electrical contact surface, and an intermediate portion of the conductive core extending axially at an intermediate location between the front and rear end portions, the rear end portion of the conductive core of the pin having a diameter larger than the diameter of the intermediate portion thereof, and the annular insulation portion comprising an inner insulating layer around the intermediate portion of the conductive core and an insulating sleeve around the inner insulating layer.

In a further embodiment, the inner insulating layer is made of a material which has set or hardened in a space between the insulating sleeve and the intermediate portion of the conductive core.

In a further embodiment, the conductive core has one or more channels at its front end communicating with a space occupied by the inner insulating layer.

In a further embodiment, the assembly comprises a socket member having a socket receiving the rear end portion of the conductive core for electrical engagement with the electrical contact surface thereof.

In a further embodiment, the contact pin has an electrically conductive earth shield arranged radially outwardly of the intermediate portion of the conductive core.

In a further embodiment, the assembly comprises first and second connector parts capable of being mated underwater, wherein the first connector part comprises the contact pin.

Another embodiment comprises an underwater electrical connection assembly comprising: a contact pin comprising an axially extending conductive core with a front portion having a front electrical contact surface and a rear portion having a rear electrical contact surface, and an annular insulation portion around said conductive core extending axially rearwardly from the front portion of the conductive core; a collar mounted on the conductive core forwardly of the rear electrical contact surface thereof, the collar being axially split and having a radially outer threaded surface; and a conductive sleeve having a radially inner threaded surface in engagement with the radially outer threaded surface of the collar so as to mount the conductive sleeve on the conductive core.

In a further embodiment, the rear portion of the conductive core, at least where the rear electrical contact surface is provided, has a diameter which is larger than that of a part of the conductive core forwardly of the collar.

In a further embodiment, the conductive sleeve engages with the annular insulation portion.

In a further embodiment, the conductive sleeve extends forwardly of the collar.

In a further embodiment, the conductive sleeve extends rearwardly of the collar.

In a further embodiment, the collar is received in an annular recess around the rear portion of the conductive core.

In a further embodiment, the assembly comprises an alignment dowel extending radially between the conductive core and the collar.

In a further embodiment, the assembly comprises an axial channel extending from the front of the engaged radially inner and radially outer threaded surfaces to the rear thereof.

In a further embodiment, the axial channel is formed in the conductive sleeve.

In a further embodiment, the conductive sleeve has an abutment surface in engagement with the annular insulation portion, and a radially outer portion disposed radially outwardly and forwardly of the abutment surface.

Another embodiment comprises an underwater electrical connection assembly comprising: a contact pin comprising an axially extending conductive core with front and rear portions each having a respective electrical contact surface, and an annular insulation portion around said conductive core extending axially rearwardly from the front portion of the conductive core; and a conductive sleeve mounted on the rear portion of the conductive core, the conductive sleeve having an abutment surface in engagement with the annular insulation portion, and a radially outer portion disposed radially outwardly and forwardly of the abutment surface.

In a further embodiment, the conductive sleeve has an annular surface which is slanted with respect to the axial direction, and which extends radially outwardly from the abutment surface to the radially outer portion.

In a further embodiment, insulating material is provided in a region rearwardly of the abutment surface.

Another embodiment comprises an underwater electrical connection assembly comprising: a contact pin comprising an axially extending conductive core with front and rear portions each having a respective electrical contact surface, and an annular insulation portion around said conductive core extending axially rearwardly from the front portion of the conductive core; a chamber containing insulating fill material which surrounds the annular insulation portion of the contact pin where it extends axially rearwardly from a first axial position; and an earth guide member extending rearwardly from said first axial position to a second axial position rearward of the first axial position, said earth guide member extending rearwardly from adjacent to the annular insulation portion at said first axial position to radially outward of said annular insulation portion at said second axial position.

In a further embodiment, the earth guide member is substantially conical.

In a further embodiment, as viewed in axial cross section, at least a part of the earth guide member has a profile which is concave.

In a further embodiment, the rear of the earth guide member is sealingly connected to a gland member around the insulating fill material.

In a further embodiment, the assembly comprises a fill opening for the introduction of fill material to the chamber.

In a further embodiment, the assembly comprises a second chamber outward of the first mentioned chamber and containing fill material.

In a further embodiment, the assembly comprises a conductive sleeve mounted on the rear portion of the conductive core, the conductive sleeve extending forwardly to a position radially inwardly of the earth guide member.

In a further embodiment, the conductive core has a portion of increasing diameter in the rearward direction, this portion being located radially inwardly of the earth guide member.

Another embodiment comprises a termination assembly for an underwater cable, comprising: a pin having an axially extending conductive core and an axially extending annular insulation portion around said conductive core; a conductive socket member for making an electrical connection with a conductor of an underwater cable and having a front socket, the front socket receiving a rear end portion of the conductive core of the pin; an electrical contact terminal in the front socket making electrical contact with said rear end portion; and a locking member for locking said rear end portion in the front socket, the locking member being disposed rearwardly of the electrical contact terminal.

In a further embodiment, said locking member engages an intermediate member which is mounted on the conductive core of the pin.

In a further embodiment, said intermediate member is mounted to an axial rear end of the rear end portion of the conductive core.

In a further embodiment, said intermediate member has an axial projection extending into an axial socket in the rear end portion of the conductive core.

In a further embodiment, said intermediate member has an engagement portion for engagement by the locking member, the engagement portion having a diameter wider than the diameter of the axial projection.

In a further embodiment, said intermediate member has an annular channel for receiving the locking member.

In a further embodiment, said intermediate member is screw mounted on the conductive core of the pin.

Another embodiment comprises a termination assembly for an underwater cable, comprising: a cable termination chamber housing having an attachment portion; a pin for electrical connection to the cable; a pin housing for the pin; and an attachment flange for attachment to the pin housing so as to protrude radially therefrom, the attachment flange being for attachment to the attachment portion of the cable termination chamber housing, and the attachment flange being provided in at least two parts so that when the parts are to be attached to the pin housing they can be moved laterally into engagement therewith.

In a further embodiment, the attachment flange is arranged to be bolted to the pin housing in the radial direction and to be bolted to the attachment portion of the termination chamber housing in the axial direction.

In a further embodiment, the assembly comprises a radially extending dowel extending between each attachment flange part and the pin housing.

In a further embodiment, the assembly comprises at least three attachment flange parts.

In a further embodiment, the assembly comprises exactly four attachment flange parts.

In a further embodiment, the attachment flange parts extend in the circumferential direction and have opposite circumferential ends, each such end being in contact with or adjacent to an end of a circumferentially adjacent attachment flange part when all the parts are attached to the pin housing.

BRIEF DESCRIPTION OF THE DRAWINGS

Exemplary embodiments will be explained in more detail below based on the schematic drawings, wherein.

DETAILED DESCRIPTION

Figure 1:
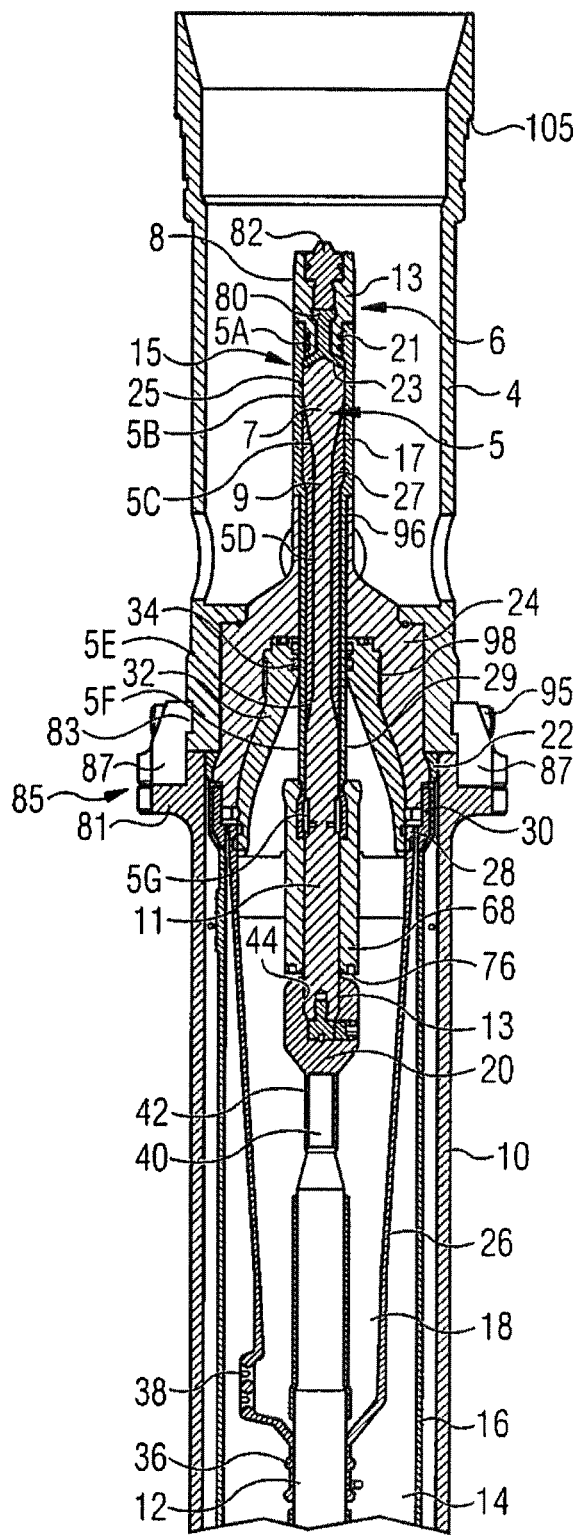
FIG. 1 is an axial cross sectional view of a first connector part having a contact pin.

Some embodiments provide an underwater electrical connector assembly having an improved contact pin design.

For example, one embodiment provides an underwater electrical connection assembly comprising a contact pin comprising an axially extending conductive core and an axially extending annular insulation portion around said conductive core, a front end portion of the conductive core having an electrical contact surface, a rear end portion of the conductive core having an electrical contact surface, and an intermediate portion of the conductive core extending axially at an intermediate location between the front and rear end portions, the rear end portion of the conductive core of the pin having a diameter larger than the diameter of the intermediate portion thereof, and the annular insulation portion comprising an inner insulating layer around the intermediate portion of the conductive core and an insulating sleeve around the inner insulating layer.

With this arrangement, the diameter of the intermediate portion of the conductive core does not limit the diameter of the rear end portion of the conductive core having the electrical contact surface, which has a diameter larger than the diameter of the intermediate portion thereof. As this is a critical region, where electrical contact between the components is made, it is advantageous to be able to provide a relatively large electrical contact surface. Any tendency of the connector to overheat in this region can be reduced or avoided.

The larger diameter of the rear end portion of the conductive core can also contribute to increased stiffness and strength of the contact pin.

In the case of the known SpecTRON 10 assembly mentioned above, the conductive core has an intermediate portion with the same diameter as the rear end portion where its rear electrical contact surface is provided. It is therefore a simple matter to insert an insulating sleeve onto the conductive core by passing it forwardly from the rear. However, in some embodiments of the underwater electrical connection assembly the rear end portion of the conductive core has a diameter larger than the diameter of the intermediate portion disposed forwardly thereof and so the known assembly method is not applicable. The inventors have recognised that by using a two part annular insulation portion it becomes possible to provide the required insulation around a conductive core intermediate portion which has a smaller diameter than the rear end portion thereof.

The insulating sleeve may be a prefabricated sleeve. During assembly, the insulating sleeve may for example be placed on the conductive core by being moved forwardly over the rear end portion, to surround the intermediate portion. The insulating sleeve may be made of a thermoplastic.

The inner insulating layer may be introduced as a flowable material, such as a liquid, which then sets in an annular space between the insulating sleeve and the intermediate portion of the conductive core, to form the inner insulating layer. The inner insulating layer may be made of a material which has set or hardened in the space between the insulating sleeve and the intermediate portion of the conductive core. The insulating sleeve which forms part of the annular insulation portion may serve to define a space into which the flowable material is introduced.

The flowable material may be introduced into the annular space from the front end of the conductive core, for example via one or more channels in the insulating sleeve and/or in the conductive core. The flowable material may then flow rearwardly into the annular space. It may flow further rearwardly at least as far as the rear of the insulating sleeve.

The inner insulating layer may be made of a thermoplastic.

The electrical contact surface of the rear portion of the conductive core may be a radially outwardly facing electrical contact surface. This takes full advantage of the relatively large diameter of the rear portion, by using the external area thereof for making electrical contact with another component.

The assembly may comprise a socket member having a socket receiving the rear end portion of the conductive core for electrical engagement with the radially outwardly facing electrical contact surface thereof.

In some embodiments of the contact pin an electrically conductive earth shield is arranged radially outwardly of the intermediate portion of the conductive core. The outside diameter of the earth shield may be the same as the outside diameter of the insulation portion forwardly thereof, so that the contact pin has a constant diameter along all of its length which, in use, is to be inserted in the entry seal of another component. Therefore, when the assembly is connected underwater to such other component, the earth shield can serve to protect the seal from high electrical stresses and the insulating sleeve from exposure to ambient water.

The connection assembly may comprise a conductive socket member having a socket which receives the conductive core rear portion in electrical engagement with the rear electrical contact surface thereof. The socket may be adapted for connection to another conductor, such as a conductor of a cable. The socket member may have a second socket for receiving such a conductor.

The assembly may comprise first and second connector parts capable of being mated underwater, wherein the first connector part comprises the contact pin as discussed herein. The second connector part may comprise a contact terminal for engagement by the electrical contact surface at the front of the conductive core to establish an electrical connection when the first and second connector parts are mated. The electrical connection may be established in a protected oil or gel filled environment in the second connector part, such as a chamber. The chamber may be pressure balanced with respect to pressure outside of the connector, for example by having a flexible wall.

The second connector part may comprise an entry seal for receiving the contact pin. If the contact pin has an electrically conductive earth shield arranged radially outwardly of the intermediate portion of the conductive core, the earth shield may extend in the entry seal of the second connector part when the connector parts are fully mated.

In some embodiments of the assembly, in the region of the contact pin where it is to enter the second connector part, the pin may have a number of layers, comprising a central conductive core, an inner insulating layer around the core, an insulating sleeve around the inner insulating layer, and an earth shield around the insulating sleeve.

Other embodiments provide an underwater electrical connection assembly with an improved arrangement for mounting a conductive member on a conductive core of a contact pin.

In the known SpecTRON 10 assembly discussed above the conductive core of the contact pin has a constant diameter over its length extending rearwardly from a front electrical contact surface thereof. The conductive core is surrounded by an insulating sleeve. The front end of the insulating sleeve abuts against a wide diameter portion of the conductive core, this wide diameter portion also providing the front electrical contact surface of the contact pin for engagement in a corresponding socket of the plug connector part. The insulating sleeve is held in the abutting relationship with the front wide diameter portion by a nut at the rear of the conductive core. The nut has an internal thread engaged with an external thread on the conductive core rear portion. The nut engages the rear end of the insulating sleeve and thus clamps it against the wide diameter portion at the front of the conductive core. The conductive core extends rearwardly behind the nut to where the rear end portion of the conductive core is received in the front socket of a socket member to make electrical contact with a contact terminal in the front socket. During assembly of the contact pin, in order for the nut to engage with the thread on the conductive core it is necessary for it to be passed over the rear end portion in a forward direction. As a result, the diameter of the rear end portion is smaller than the internal diameter of the female thread on the nut.

One embodiment provides an underwater electrical connection assembly comprising: a contact pin comprising an axially extending conductive core with a front portion having a front electrical contact surface and a rear portion having a rear electrical contact surface, and an annular insulation portion around said conductive core extending axially rearwardly from the front portion of the conductive core; a collar mounted on the conductive core forwardly of the rear electrical contact surface thereof, the collar being axially split and having a radially outer threaded surface; and a conductive sleeve having a radially inner threaded surface in engagement with the radially outer threaded surface of the collar so as to mount the conductive sleeve on the conductive core.

By mounting an axially split collar on the conductive core, the collar having a radially outer threaded surface for engaging with a radially inner threaded surface of a conductive sleeve, the internal diameter of the threaded surface of the conductive sleeve may be increased compared to the diameter it would need to be if threadedly engaging the conductive core directly. This enables the diameter of the conductive core rearwardly of the collar to be made larger, if desired. The arrangement permits the rear portion of the conductive core having the rear electrical contact surface to have a relatively large diameter. This is beneficial in that a large electrical contact area can be provided, allowing reduced resistance across the connection and reducing the temperature when a current flows.

In some embodiments, the rear portion of the conductive core, at least where the rear electrical contact surface is provided, has a diameter which is larger than that of a part of the conductive core forwardly of the collar.

The conductive sleeve may engage with the annular insulation portion. It may therefore serve to hold the annular insulation portion in position, for example by preventing it from moving rearwardly relative to the conductive core. The annular insulation portion may comprise an insulating sleeve which is clamped between the front portion of the conductive core and the conducting sleeve in the axial direction. The conductive sleeve can usefully serve this purpose, The conductive sleeve can serve to provide heat dissipation of the conductive core. The conductive sleeve may be arranged on the rear portion, for example forwardly of the rear electrical contact surface thereof. This portion has a tendency to get hot at higher currents because of the electrical connection via the rear electrical contact surface to another component behind the contact pin, such as to a socket of a socket member.

The collar may be made of an electrically conductive material, e.g., a metallic material. Electrically conductive materials, such as metals, are also good thermal conductors. The collar can then serve to transmit heat from the conductive core to the conductive sleeve, assisting the heat dissipation function of the conductive sleeve.

If the collar is made of an electrically conductive material, it can provide an electrical connection between the conductive core and the conductive sleeve. During use of the assembly, the conductive sleeve may then adopt the same electric potential as the conductive core. The interengaging threads of the collar and the conductive sleeve, and the area around these threads, can then be at the same electric potential and therefore not subject to electrical stress which could lead to partial electrical discharge and increased heat. The conductive sleeve can effectively serve to cloak the threads and the area adjacent to the threads from an electric field gradient. The conductive sleeve may extend forwardly of the collar in order to take full advantage of this cloaking effect.

By being axially split, during construction of the contact pin the collar does not need to be positioned on the conductive core by being passed over one or other end thereof. Rather, the collar can be positioned on the conductive core by lateral engagement therewith. The inside diameter of the collar therefore does not need to be larger than either end portion of the conductive core, allowing the rear portion (and if desired the front portion) of the conductive core to have a wider diameter than the inside diameter of the collar.

The radially inwardly facing surface of the split collar, which makes contact with the conductive core, may be substantially smooth.

The collar may be axially split by one axial split line or by a plurality thereof. It may have two axial split lines. It may be provided in two parts, each arranged to extend round half the circumference of the conductive core. The collar may be initially formed as a cylinder and the thread formed on the outside of the cylinder, before the collar is axially split.

The collar may be received in an annular recess around the conductive core. This assists during manufacture of the contact pin in locating the collar in the correct axial position. There may be an alignment dowel extending radially between the conductive core and the collar. This can assist in locating the collar in the correct rotational position and the correct axial position. In the arrangements discussed above wherein the conductive sleeve cloaks the collar from an electric field gradient, the conductive sleeve can also function to cloak the annular recess if provided, and the dowel if provided.

The annular insulation portion may be at least partly formed by flowable material. During manufacture of the contact pin, the flowable material may be introduced around the conductive core and allowed to set or harden. The flowable material may be solid once it has set. The material may be introduced so as to occupy one or more cavities around or adjacent to the conductive core. If the annular insulation portion comprises an insulating sleeve this may serve to enclose a space around the conductive core. The cavity may be occupied by the flowable material once solidified.

The flowable material may be introduced from the front of the contact pin. The front portion of the conductive core may for example have an axially extending passage, which may allow introduction of flowable material. Such a passage may then connect with the one or more cavities around or adjacent to the conductive core.

In one embodiment the contact pin is arranged to permit flowable material to be introduced from the front thereof during formation of the annular insulation portion, and the contact pin has an exit point for the flowable material at the rear of the conductive sleeve.

The connection assembly may comprise a conductive socket member having a socket which receives the conductive core rear portion in electrical engagement with the rear electrical contact surface thereof. The socket may be adapted for connection to another conductor, such as a conductor of a cable. The socket member may have a second socket for receiving such a conductor.

The socket member may have an outside diameter substantially equal to the outside diameter of the conductive sleeve. The rear of the conductive sleeve may be adjacent to the socket member. In use, the rear portion of the conductive core, the conductive sleeve and the socket member may all be at the same electric potential and the exit point of flowable material at the rear of the conductive sleeve is at least partly surrounded by these three components and so is not subject to any electric field gradient. Thus the flowable material exit point, where potentially air may be trapped during the contact pin construction procedure, is cloaked and is not subject to electrical stress which might otherwise cause partial electrical discharge and heat generation.

Any space between the conductive sleeve and the conductive core may be filled with insulating material. This can be achieved by using flowable material to occupy any such space. The assembly may comprise an axial channel extending from the front of the engaged radially inner and radially outer threaded surfaces to the rear thereof. The axial channel can serve to allow e.g. flowable material to flow from in front of the collar to the rear thereof. The provision of an axial channel can ensure that there are no pockets of air between the conductive sleeve and the conductive core.

There may be a plurality of axial channels. The or each axial channel may be formed in the conductive core or the conductive sleeve, or partly in each of these components. The or each axial channel may be formed in the conductive sleeve.

As discussed above the conductive sleeve may engage with the annular insulation portion, and this may allow the conductive sleeve to hold the insulation portion in position by preventing it from moving rearwardly relative to the conductive core. The conductive sleeve may have an abutment surface in engagement with the annular insulation portion.

In one arrangement, the conductive sleeve has an abutment surface in engagement with the annular insulation portion, and a radially outer portion disposed radially outwardly of and forwardly of the abutment surface. In use, providing the conductive sleeve is at the same electric potential as the conductive core, with such an arrangement the forwardly disposed radially outer portion of the conductive sleeve can protect from electric stress the region where the conductive sleeve abutment surface and the annular insulation portion are in engagement. In effect, the radially outer portion can cloak the region in question. The region can be at substantially the same electric potential as the conductive core and the conductive sleeve, and therefore not subject to partial electrical discharge and hence heat generation. Even if an air pocket exists in this region such a partial electrical discharge is avoided.

The assembly may comprise first and second connector parts capable of being mated underwater, wherein the first connector part comprises the contact pin as discussed herein. The second connector part may comprise a contact terminal for engagement by the electrical contact surface at the front of the conductive core to establish an electrical connection when the first and second connector parts are mated. The electrical connection may be established in a protected oil or gel filled environment in the second connector part, such as a chamber. The chamber may be pressure balanced with respect to pressure outside of the connector, for example by having a flexible wall. The second connector part may comprise an entry seal for receiving the contact pin. The contact pin may extend through the entry seal and into the second connector part when the connector parts are fully mated.

Other embodiments provide an underwater electrical connection assembly with an improved design of a conductive member on a conductive core of a contact pin.

For example, one embodiment provides an underwater electrical connection assembly comprising: a contact pin comprising an axially extending conductive core with front and rear portions each having a respective electrical contact surface, and an annular insulation portion around said conductive core extending axially rearwardly from the front portion of the conductive core; and a conductive sleeve mounted on the rear portion of the conductive core, the conductive sleeve having an abutment surface in engagement with the annular insulation portion, and a radially outer portion disposed radially outwardly of and forwardly of the abutment surface.

The radially outer portion can serve to shield the region where the conductive sleeve abutment surface is in engagement with the annular insulation portion from electrical stress, as explained above.

The abutment surface may be arranged to hold the annular insulation portion in position relative to the conductive core. The abutment surface may extend annularly. The abutment surface may extend radially. For example, a radially inner portion of the abutment surface may be at the same axial position as a radially outer portion thereof.

During assembly of the contact pin, the conductive sleeve may be moved forwardly on the conductive core, for example by being screwed thereon, so as to clamp the annular insulating portion between the front portion of the conductive core and the conducting sleeve in the axial direction.

It is preferred for the conductive sleeve to have an annular surface which is slanted with respect to the axial direction, and which extends radially outwardly from the abutment surface to the radially outer portion of the conductive sleeve.

Insulating material may be provided rearwardly of the abutment surface. During manufacture of the contact pin, such insulating material may be introduced as flowable material. The annular insulation portion and the conductive sleeve may be engaged to form a closure at the front of a space occupied by the insulating material, the space being to the rear of the abutment surface. This can assist during contact pin construction to allow the space to be filled with flowable material without leaking forwardly of the abutment surface. The engagement of a metal conductive sleeve with an insulating sleeve made of plastics can form such a closure.

Insulating material may be provided in a region rearwardly of the abutment surface. This region may be defined radially outwardly of the conductive core and radially inwardly of the conductive sleeve. The insulating material may be a solid material which has hardened from a flowable material.

The connection assembly may comprise a conductive socket member having a socket which receives the conductive core rear portion in electrical engagement with the rear electrical contact surface thereof. The socket may be adapted for connection to another conductor, such as a conductor of a cable. The socket member may have a second socket for receiving such a conductor.

The assembly may comprise first and second connector parts capable of being mated underwater, wherein the first connector part comprises the contact pin as discussed herein. The second connector part may comprise a contact terminal for engagement by the electrical contact surface at the front of the conductive core to establish an electrical connection when the first and second connector parts are mated. The electrical connection may be established in a protected oil or gel filled environment in the second connector part, such as a chamber. The chamber may be pressure balanced with respect to pressure outside of the connector, for example by having a flexible wall. The second connector part may comprise an entry seal for receiving the contact pin. The contact pin may extend through the entry seal and into the second connector part when the connector parts are fully mated.

Other embodiments provide an underwater electrical connection assembly with an improved earth guiding arrangement.

In the SpecTRON 10 assembly discussed above, the rear of the contact pin is encapsulated in a body of insulating fill material contained in a chamber defined within a gland. A second, outer chamber is arranged radially outwardly of the first mentioned, inner chamber, and has a wall defined by another gland the outside of which is exposed to ambient conditions. The outer chamber also contains insulating fill material. The arrangement allows external ambient pressure on the gland of the outer chamber to be transmitted via the gland to the outer chamber and then via the gland of the inner chamber to the region surrounding the rear of the contact pin.

Outside of the assembly the ambient water is at earth potential. On the other hand, the conductive core of the contact pin and the cable conductor are intended to carry high voltages, such as several kilovolts. The contact pin is supported at an intermediate location thereof by a metal support which is at earth potential. The contact pin has an insulating sleeve which insulates the conductive core from the earthed support and is designed to withstand the high electrical stress across its thickness. To the rear of the earthed support an insulating insert is provided around the insulating sleeve and is designed to accommodate the electrical stress where the insulating sleeve emerges rearwardly from the earthed support. The insulating insert is inserted as a solid member around the contact pin. It forms a front wall of the inner chamber surrounded by the inner gland.

Such embodiments may provide an improved arrangement for dealing with even higher voltages in an underwater environment as compared with conventional assemblies.

One embodiment provides an underwater electrical connection assembly comprising: a contact pin comprising an axially extending conductive core with front and rear portions each having a respective electrical contact surface, and an annular insulation portion around said conductive core extending axially rearwardly from the front portion of the conductive core; a chamber containing insulating fill material which surrounds the annular insulation portion of the contact pin where it extends axially rearwardly from a first axial position; and an earth guide member extending rearwardly from said first axial position to a second axial position rearward of the first axial position, said earth guide member extending rearwardly from adjacent to the annular insulation portion at said first axial position to radially outward of said annular insulation portion at said second axial position.

In such an arrangement, the earth guide member can serve to control the electric stress between the conductive core and itself, particularly in the insulating fill material occupying the space in the chamber radially inwardly of the earth guide member and radially outwardly of the annular insulation portion of the contact pin.

Electric stress is created in an insulator where there is a change of electric potential. In areas where electric potential changes over a short distance, i.e. there is a high electric potential gradient, then electric stress is correspondingly high. The electric field is also influenced at the interface between two materials because of their different dielectric properties. In addition, where there is an interface this has the risk that air pockets may be trapped and if the electric stress exceeds a certain amount in air, typically 2 kV/mm, then arcing may occur. A further possible issue is that if an underwater assembly is compromised and a leak occurs, then water or other contaminants may track along an interface between materials.

By providing an earth guide member extending rearwardly from a first axial position in relation to the contact pin the electric stress in the fill material radially inwardly of the earth guide member and outwardly of the contact pin can be controlled. The electric stress can be determined based on the shape of the earth guide member, in particular its profile as viewed in axial cross section.

The earth guide member may be substantially conical. The cone may increase in diameter in the rearward direction. In certain some embodiments, as viewed in axial cross section, at least part of the earth guide member has a profile which is concave. For example, the earth guide member may have a concave profile towards its rear. In some embodiments, the earth guide member has a conical front part, with a profile which in axial cross section is substantially straight, and a rear part with a concave profile as viewed in axial cross section.

The rear of the earth guide member may be sealingly connected to a gland member around the insulating fill material. The gland member may provide a wall of the chamber containing the fill material. The gland member can serve to pressure balance the interior of the chamber to the pressure external of the gland member. A second chamber may be provided outward of the first mentioned chamber and may also contain fill material. The second chamber may have a wall the outside of which is exposed to ambient pressure conditions to permit pressure balancing between the outside and the inside of the wall. Thus the wall may comprise another gland member. External pressure may therefore be transmitted via the outer gland member to the outer chamber and then via the inner gland member to the chamber containing the insulating fill material which surrounds the annular insulation portion of the contact pin where it extends axially rearwardly from the first axial position.

The earth conditions around the contact pin may change in certain failure or partial failure modes of the assembly. For example, if an outer chamber is provided and it is compromised so as to allow the ingress of water then earth conditions are changed. For example the water outside of an outer gland forms the earth in this region of the assembly under normal operating conditions, whereas if the outer chamber becomes flooded or partly flooded then the water which has entered the assembly forms modified earth surroundings.

By providing an earth guide member as disclosed herein, electric stress in the region between the contact pin and the earth guide member and rearwardly of the first axial position, in the insulating fill material, can be kept substantially the same even if the earth conditions elsewhere in the assembly are changed due to a failure or partial failure of sealing integrity.

The insulating fill material surrounds at least the annular insulation portion of the contact pin where it extends axially rearwardly from the first axial position. The provision of the earth guide member radially outwardly of the fill material in this region avoids the need for a separate insulating insert to be used. The fill material may be caused to surround the contact pin annular insulation portion by occupying the space around the annular insulation portion when the fill material is in a flowable form. It may remain in flowable form, for example being in the form of a gel or oil, but it may be a material which hardens, for example to solid form. By using a fill material which is flowable when surrounding the annular insulation portion, residual air pockets can be avoided. A fill opening may be provided for the introduction of fill material to the chamber. After introduction the opening is closed and will remain closed in normal use of the assembly.

One suitable insulating fill material is a silicone elastomer.

The shape of the conductive core radially inwardly of the earth guide member is also relevant to the electric stress. In some embodiments, the conductive core has a portion of increasing diameter in the rearward direction, this portion being located radially inwardly of the earth guide member. Thus, as the earth guide member extends rearwardly, adjacent to the annular insulation portion at the first axial position to radially outward of the annular insulation portion at the second axial position, the conductive core diameter may increase. This can be beneficial, as discussed elsewhere herein, in allowing the rear portion of the conductive core to have a relatively wide diameter. Because the earth guide member, as it extends rearwardly, has an increasing radial distance from the contact pin, the conductive core within the contact pin can itself increase in diameter without reducing the distance between the conductive core and the earth guide member. For example, the conductive core increasing diameter portion may be generally conical, with a diameter increasing in the rearward direction.

In certain arrangements, there may be a conductive sleeve mounted on the rear portion of the conductive core. As discussed elsewhere herein, such a conductive sleeve may provide a number of functions, such as thermal dissipation, electric stress control, and retention of an insulating sleeve forming part of the annular insulation portion.

The conductive sleeve may extend forwardly to a position radially inwardly of the earth guide member. Thus the earth guide member can advantageously control, or assist in controlling, the electrical stress in the region at the front of the conductive sleeve, which may be a region where air pockets may in certain embodiments be trapped.

The connection assembly may comprise a conductive socket member having a socket which receives the conductive core rear portion in electrical engagement with the rear electrical contact surface thereof. The socket may be adapted for connection to another conductor, such as a conductor of a cable. The socket member may have a second socket for receiving such a conductor.

The assembly may comprise first and second connector parts capable of being mated underwater, wherein the first connector part comprises the contact pin as discussed herein. The second connector part may comprise a contact terminal for engagement by the electrical contact surface at the front of the conductive core to establish an electrical connection when the first and second connector parts are mated. The electrical connection may be established in a protected oil or gel filled environment in the second connector part, such as a chamber. The chamber may be pressure balanced with respect to pressure outside of the connector, for example by having a flexible wall. The second connector part may comprise an entry seal for receiving the contact pin. The contact pin preferably extends through the entry seal and into the second connector part when the connector parts are fully mated.

Other embodiments provide a termination assembly for an underwater cable having an improved locking arrangement between a rear end portion of a conductive core of a pin and a conductive socket member for making an electrical connection with a conductor of the underwater cable.

In the known SpecTRON 10 connector, it is known to terminate an underwater cable to either of the receptacle and plug connector parts. In the case of a receptacle connector part, the rear end of the contact pin electrically connects to an underwater cable via a cable termination assembly. In the case of a plug connector part, a pin is formed with a socket at its front end for receiving the electrical contact surface of a contact pin of a receptacle connector part, and the rear end of the pin electrically connects to an underwater cable via a cable termination assembly.

In each case, the cable termination assembly includes a conductive crimp sleeve having rear and front sockets. The rear socket receives a conductor of an underwater cable and is crimped thereon to establish a mechanical and electrical connection. The front socket of the crimp sleeve receives a rear end portion of a conductive core of the pin (respectively belonging to a receptacle or a plug connector part), and there is an electrical contact terminal in the front socket which makes electrical contact with the rear end portion. The rear end portion of the conductive core is formed around the outside with an annular recess. The crimp sleeve is provided with a radial passage formed with a female thread for receiving the male thread of a grub screw which has a front end which locks in the annular recess of the conductive core, thereby locking the crimp sleeve to the conductive core. The locking arrangement provided by the annular recess and the grub screw is located axially forwardly of the electrical contact terminal.

One embodiment provides a termination assembly for an underwater cable, comprising: a pin having an axially extending conductive core and an axially extending annular insulation portion around said conductive core; a conductive socket member for making an electrical connection with a conductor of an underwater cable and having a front socket, the front socket receiving a rear end portion of the conductive core of the pin; an electrical contact terminal in the front socket making electrical contact with said rear end portion; and a locking member for locking said rear end portion in the front socket, the locking member being disposed rearwardly of the electrical contact terminal.

By providing the locking member rearwardly of the electrical contact terminal, the electrical flow path from the underwater cable to the pin can bypass the locking member. The electrical flow path may extend from the pin conductive core via the electrical contact terminal in the front socket of the conductive socket member, and via the conductive socket member to the conductor of the underwater cable. If the pin conductive core is damaged by the locking member, this does not necessarily affect the electrical flow path because any such damage will likely occur rearwardly of the electrical contact terminal.

In the known cable termination assembly described above, the inventors found that the locking arrangement between the pin conductive core and the crimp could lead to cracking during vibration testing of the assembly. Such cracking can lead to a loss of electrical continuity from the front end of the conductive core to the rear end portion where the conductive core makes electrical contact with the electrical contact terminal in the front socket of the crimp sleeve. This would have a negative effect on electrical performance.

The locking member may be arranged radially in a wall of the conductive socket member. It may be in the form of a locking pin or locking screw, such as a grub screw, supported in a radial passage in the conductive socket member. When the conductive socket member is to be locked to the conductive core, the locking member may be turned to cause it to move radially inwardly to effect locking of the conductive socket member to the conductive core. In some embodiments a plurality, e.g. three, radially arranged locking members may be provided.

The locking member may be arranged to engage the rear end portion of the pin conductive core directly. The locking member may engage an intermediate member, such as a shoe member, which is mounted on the conductive core of the pin. The locking member may extend radially in a wall of the conductive socket member to engage the intermediate member.

By providing an intermediate member, this member may be formed of a different material from that of the conductive core and a material may be selected for its mechanical rather than electrical properties, whereby the intermediate member has a reduced likelihood of being damaged by the locking member. In the known termination assembly described above, the grub screw is made of steel and there was a tendency for it to dent or even fracture the relatively soft copper of the pin conductive core.

Moreover, by using an intermediate member, it is possible to avoid the presence of an annular recess in the conductive core. In the known termination assembly described above, such an annular recess results in a reduced cross-sectional area of the conductive core for flow of electrical current, with a resultant tendency for the reduced diameter portion to become a connector "hot-spot". In general it is desirable to minimise temperature increases caused by increased electrical resistance over the extent of the termination assembly.

The intermediate member may be a sleeve extending round the rear end portion of the conductive core. The intermediate member may be mounted to an axial rear end of the rear end portion of the conductive core. This can leave a major part, or all of, the axial extent of the rear end portion for making electrical contact with the electrical contact terminal in the front socket of the conductive socket member. This axial extent can be used for electrical connection rather than mechanical connection purposes.

The intermediate member may have an axial projection extending into an axial socket in the rear end portion of the conductive core. Such an axial socket can be provided without encroaching on the radially outwardly facing surface of the rear end portion, thereby not compromising the available area for electrical current flow. The axial projection may be fitted into the axial socket by a force fit, by a bayonet fit, or by some other fitting. The axial projection may be screw fitted into the axial socket.

In one embodiment, the intermediate member has an engagement portion for engagement by the locking member, the engagement portion having a diameter wider than the diameter of the axial projection. The provision of a wider diameter engagement portion increases the available space for engagement by the locking member, ensuring a good mechanical connection can be obtained. A larger locking member may be used. For example, if the locking member is a locking screw or pin or the like, arranged radially in a wall of the conductive socket member, then a wider diameter engagement portion allows a larger diameter locking member to be used.

The intermediate member may have a recess for receiving the locking member. Where plural locking members are provided, then plural individual recesses may be provided. The intermediate member may have an annular channel for receiving the locking member. In the case of plural locking members, the same annular channel can serve to receive all the locking members.

The intermediate member may be attached to the conductive core of the pin in various ways. The intermediate member may be screw mounted on the conductive core of the pin, for example by a screw thread provided on the radially outwardly facing surface of the conductive core rear end portion, or by a screw fit of an axial projection of the intermediate member into an axial socket in the rear end portion as described above.

The electrical contact terminal in the front socket of the conductive socket member may be provided by the radially inwardly facing wall of the front socket. Thus the electrical contact terminal may be an integral part of the conductive socket member. It may be a reduced diameter portion of the front socket. However, the electrical contact terminal may be provided by a conductive contact cage received in the front socket. The contact cage may ensure a tight fit and hence a reliable electrical current flow path. It may have a certain resilience to provide the fit. It may be of generally cylindrical form with axially extending slots.

The disclosed termination assembly can be used when the pin is part of an underwater connector. The pin may therefore be part of a first connector part which is mateable underwater with a second connector part having a contact terminal with which the pin makes an electrical connection. It could also be used in a case where the pin is provided at the back of a connector part, such as a plug connector part, which itself provides a contact socket for receiving a contact pin of a first connector part, such as a receptacle connector part. The pin need not necessarily be part of a mateable and demateable connector. Thus it may be provided where a cable is to be terminated to a bulkhead or the like, and the pin may have a permanent or semi-permanent connection to another component at its front end.

Other embodiments provide a termination assembly for an underwater cable with an improved arrangement for attaching together a cable termination chamber housing and a housing for a pin to which the cable is to be electrically connected.

In the SpecTRON 10 assembly discussed above, a housing for a cable termination chamber is attached to a housing for a pin. The pin projects rearwardly into the termination chamber where it is electrically connected to the front end of the cable. In a typical use of the assembly the pin housing is attached to another structure by a flange which has to be passed over the pin housing from rear to front, where it is bolted to the other structure. The flange is therefore formed with an opening which allows it to be passed over the pin housing when installation on the structure is required. In order that the hole in the structure engaging flange does not need to be excessively large, the pin housing at the rear is designed to have a relatively small "footprint" when viewed in the axial direction. This posed a problem in how to form a secure and strong connection to the termination chamber housing. This was dealt with by forming the termination chamber housing in two axially split parts, known as a split bridge. Each part has at its front end half of a dovetail joint and the other half of the dovetail joint is provided at the rear of the pin housing. When it is desired to assemble the two housings together, each split bridge is engaged with the rear of the pin housing to complete the dovetail joint. The two split bridge components are secured to each other and in order to tighten the dovetail joint the split bridge is pulled axially rearwardly relative to the pin housing by a locking screw ring engaging a threaded portion at the rear of the termination chamber housing, the locking screw ring also urging an outer cylindrical sleeve of the termination chamber housing forwardly. The outer cylindrical sleeve has a front end which engages the contact pin housing which is thus urged forwardly by tightening of the locking screw ring relative to the split bridge which is pulled rearwardly. The dovetail joints are thereby placed in axial tension and made secure.

The dovetail joint halves provided by the pin housing are radially inset from the outer cylindrical sleeve of the termination chamber housing and from the outermost diameter of the pin housing. It is therefore a simple matter to pass a flange over the pin housing, before it has been attached to the termination chamber housing, from rear to front, this flange then being used to secure the pin housing to the other structure.

One embodiment provides a termination assembly for an underwater cable, comprising: a cable termination chamber housing having an attachment portion; a pin for electrical connection to the cable; a pin housing for the pin; and an attachment flange for attachment to the pin housing so as to protrude radially therefrom, the attachment flange being for attachment to the attachment portion of the cable termination chamber housing, and the attachment flange being provided in at least two parts so that when they are to be attached to the pin housing they can be moved laterally into engagement therewith.

Such an arrangement can provide a stronger connection between the termination chamber housing and the pin housing. It does not require the use of a split bridge or dovetail joint. Moreover, it is possible to maintain a relatively small "footprint" of the pin housing as viewed in the axial direction, prior to engagement of the attachment flange with the pin housing. When it is desired to install the pin housing to another structure a suitable flange may be passed over the pin housing from rear to front, and then after that step the parts of the attachment flange may be moved laterally into engagement with the pin housing.

The attachment flange may be bolted to the pin housing. The attachment flange may be bolted to the termination chamber housing. In one embodiment, the attachment flange is arranged to be bolted to the pin housing in the radial direction and to be bolted to the attachment portion of the termination chamber housing in the axial direction. The termination chamber housing may be provided with a suitable external flange for receiving axial bolts. The pin housing may be provided with radial bolt holes for receiving radial bolts.

A radially extending dowel may be arranged to extend between each part of the attachment flange and the pin housing. Such a dowel can serve to improve the torsional strength of the assembly. A radial hole may be provided in the pin housing and a radial hole may be provided in the attachment flange part, allowing a dowel to be radially inserted. However this would require the hole in the attachment flange part to be filled after the dowel has been inserted and there may be a risk of the dowel falling out. It is therefore preferred to provide a dowel integrally on the pin housing or on the attachment flange part. In one embodiment a dowel extends radially outwardly from the pin housing and is received in a blind bore in the attachment flange part.

Two attachment flange parts may be provided. However, where a dowel is provided integrally with either the pin housing or the circumferentially extending part, in order to permit assembly of the part onto the pin housing only one dowel can be provided per part. It is therefore preferred to provide at least three circumferentially parts. This can allow at least three dowels to be used, and hence allows for a stronger construction.

In one embodiment, exactly four attachment flange parts are provided.

The attachment flange parts may be arranged so as to extend partly round the pin housing, with intervals between the parts. However, the circumferentially extending parts may extend around the pin housing in its entirety, without circumferential intervals. This maximises the space available for bolts, dowels etc. and also serves to provide torsional rigidity.

The attachment flange parts may extend in the circumferential direction and have opposite circumferential ends. Each such end may be adjacent to an end of a circumferentially adjacent attachment flange part when all the parts are attached to the pin housing.

At least one of the attachment flange parts may have a radially outer portion with a profile which is arcuate and concave. Such a concave arcuate profiled portion may assist in providing an axial "line of sight" to a bolt head or the like for attaching a flange towards the front of the pin housing to another structure. Such a line of sight can facilitate tool access to the bolt or the like. A concave arcuate profiled portion may be provided at a circumferential end of a circumferentially extending part, so that when two circumferentially extending parts are arranged circumferentially adjacent to each other, their concave arcuate profiled portions may be disposed adjacent to each other. Each individual concave arcuate profiled portion may then contribute only half of the space facilitating tool access. Where radial and axial bolts are provided for attaching the flange attachment parts to the pin housing and to the attachment portion of the cable termination chamber housing, these may be inset from the circumferential ends of the flange attachment parts, and this inset space can advantageously be used for positioning the concave arcuate profiled portions.

The disclosed termination assembly can be used when the pin housing is part of an underwater connector. The pin housing may therefore be part of a first connector part which is matable under water with a second connector part having a contact terminal with which the pin makes an electrical connection. It could also be used in a case where the pin is provided at the back of a connector part, such as a plug connector part, which itself provides a contact socket for receiving a contact pin of a first connector part, such as a receptacle connector part. The pin housing need not necessarily be part of a matable and dematable connector. Thus it may be provided where a cable is to be terminated to a bulk head or the like, and the pin may have a permanent or semi-permanent connection to another component at its front end.

Underwater connectors as discussed herein in relation to any disclosed embodiment may be capable of being mated under water, and may also be capable of being demated under water.

Figure 2:
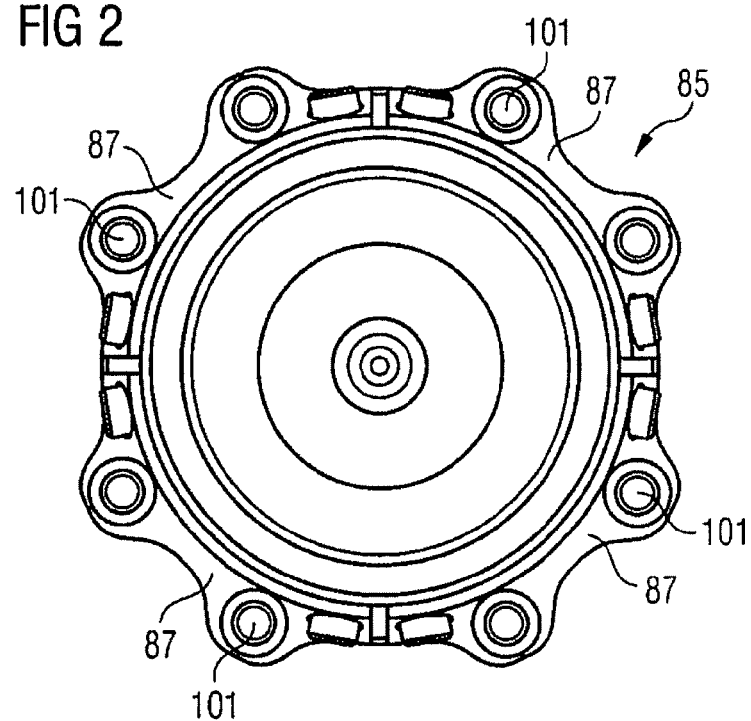
FIG. 2 is an enlarged end view from the front of the first connector part, viewed from the left as seen in FIG. 1.
Figure 3:
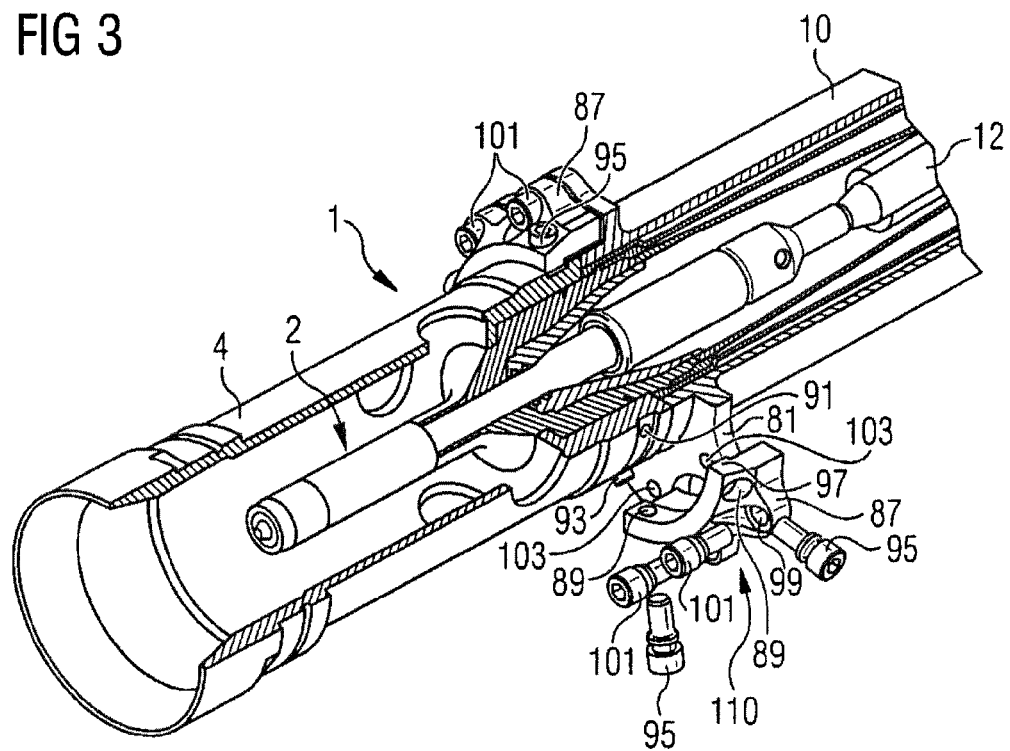
FIG. 3 is a partially cut away and partially exploded perspective view of the connector part.

Referring to FIGS. 1, 2 and 3, a first (receptacle) connector part 1 is shown. At the rear of the connector part 1 a cable termination chamber housing 10 is secured to the contact pin housing 4 by a housing attaching arrangement 110.

Figure 9:
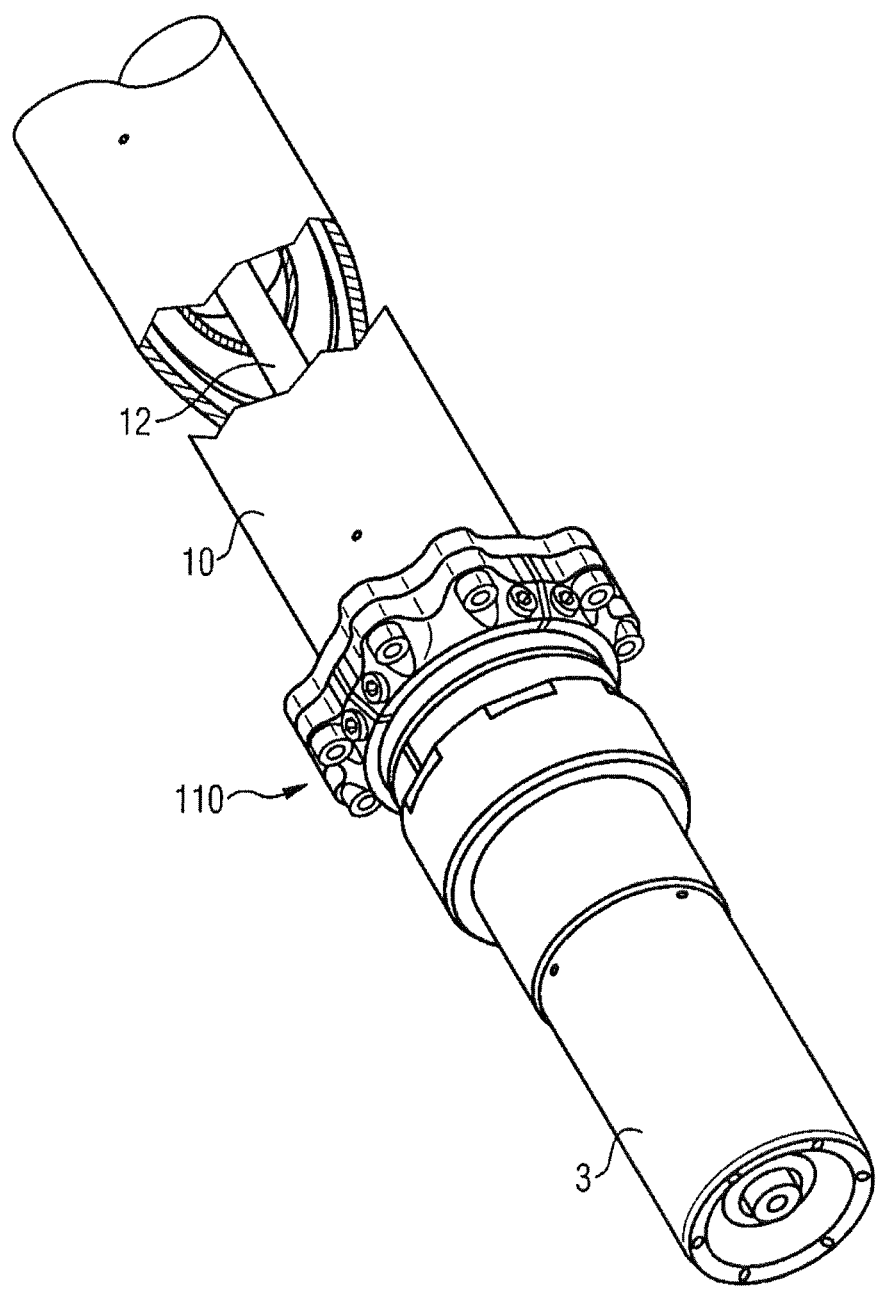
FIG. 9 is a partially cut away perspective view of a second connector part with which the first connector part is mateable.

FIG. 9 shows a second (plug) connector part 3, which is attached at its rear to another cable termination chamber housing 10 by another housing attaching arrangement 110.

The connector part 1 has a centrally located and axially extending contact pin 2 supported in the contact pin housing 4. The housing 4 surrounds the front part of the contact pin and forms a receptacle into which the second connector part 3, shown in FIG. 9, may be inserted. The contact pin has at its front end portion 6 an annularly extending electrical contact surface 8 forming an electrical contact terminal.

In use, the second connector part 3 will be inserted into the contact pin housing 4 of the first connector part 1 and the contact pin 2 will enter a chamber in the second connector part 3 where the electrical contact surface 8 of the pin will engage in a corresponding electrical contact socket of the plug connector part. Thus the connector parts 1 and 3 together form a connector capable of being mated and demated underwater. This type of mating and demating arrangement is known, for example from GB 2192316.

The contact pin 6 has an axially extending conductive core 5 which has a front end portion 7 providing the electrical contact surface 8, a rear end portion 11 providing a radially outwardly facing electrical contact surface 13, and an intermediate portion 9 extending axially at an intermediate location between the front and rear portions.

At the rear of the connector part 1 the cable termination chamber housing 10 is secured to the contact pin housing 4. An underwater electric cable 12 extends into the cable termination housing in a known manner. The front end of the cable 12 extends into a protected environment within the cable termination housing 10. It passes first into an outer chamber which is contained by a generally cylindrical flexible gland 16. The outer chamber 14 is occupied by a fluid medium, such as gel or oil, which is a dielectric. The rear of the outer chamber 14 is not shown but is sealed in known manner with respect to the cable termination housing 10 and the jacket of the cable 12. The outside of the gland is exposed via suitable apertures in the cable termination housing 10 to ambient conditions, such as seawater. The flexibility of the gland 16 allows the outer chamber 14 to be pressure balanced with respect to ambient pressure. At its front end the gland 16 has an annular lip 22 which is trapped between an inside surface of the cable termination housing 10 and an outside surface of a contact pin support member 24. In this manner the front of the outer chamber 14 is sealingly closed.

An inner chamber 18 contains the front end of the cable 12, including the region where it makes electrical contact with a conductive socket sleeve 20. The inner chamber 18 has a flexible wall 26 the outside of which is exposed to the fluid medium in outer chamber 14. The flexible wall 26 has at its front end an annular lip 28 which is trapped between an inside surface of a cap 30 and an outside surface of an earth guide member 32. The earth guide member 32 has a front end which engages with the outside of the contact pin 2 by means of a pair of O-rings 34. In this manner the inner chamber 18 is sealed at its front end. At its rear, the flexible wall 26 of the inner chamber 18 forms a stretch seal 36 against the outside of the cable 12.

Towards the rear of the inner chamber 18 the flexible wall 26 has a pair of openings 38. One of these openings can be used during assembly of the connector part to fill the inner chamber 18 with fill material, such as a silicone elastomer, whilst the other opening can be used for the escape of air from the chamber. Once the chamber is filed with fill material the openings 38 are sealed closed. The fill material is capable of flowing during filling, so as to occupy, to the extent possible, all the volume of the chamber 18, including small apertures, crevices and the like. It may therefore be of a liquid consistency at the filling stage. It is thus a flowable material. After filling, the filling material hardens to a solid form. Certain known silicone elastomers have these properties and such a filling and hardening process is known in the art.

Figure 4:
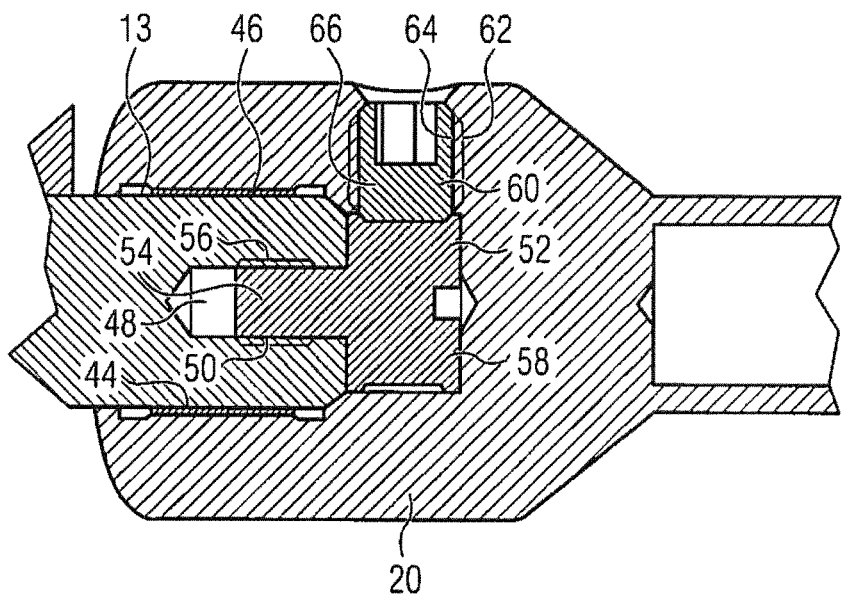
FIG. 4 is an enlarged view of part of FIG. 1 showing a locking arrangement between a rear end portion of a conductive core of a pin and a conductive socket sleeve.
Figure 5:
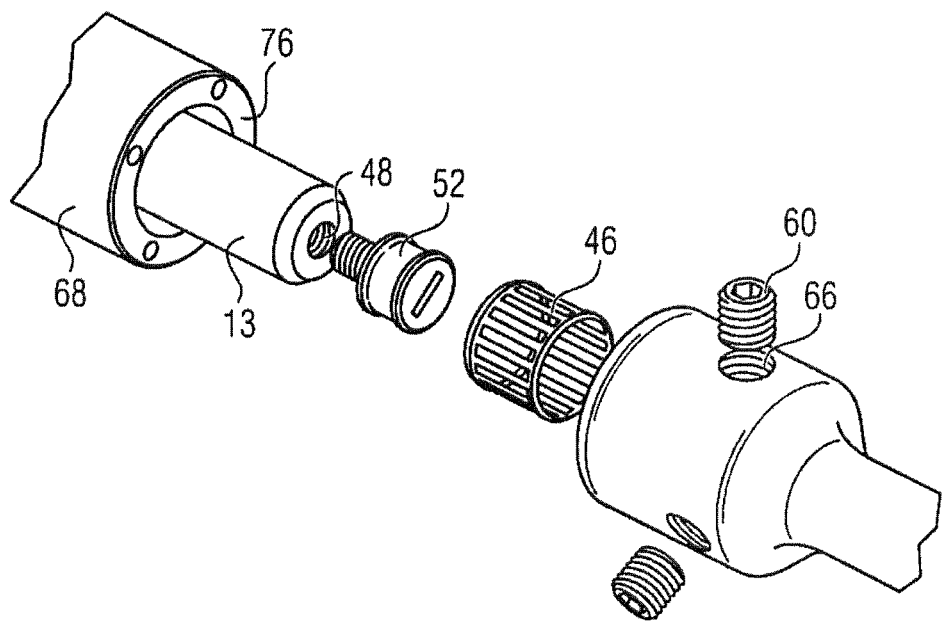
FIG. 5 is an exploded perspective view of the locking arrangement.
Figure 6:
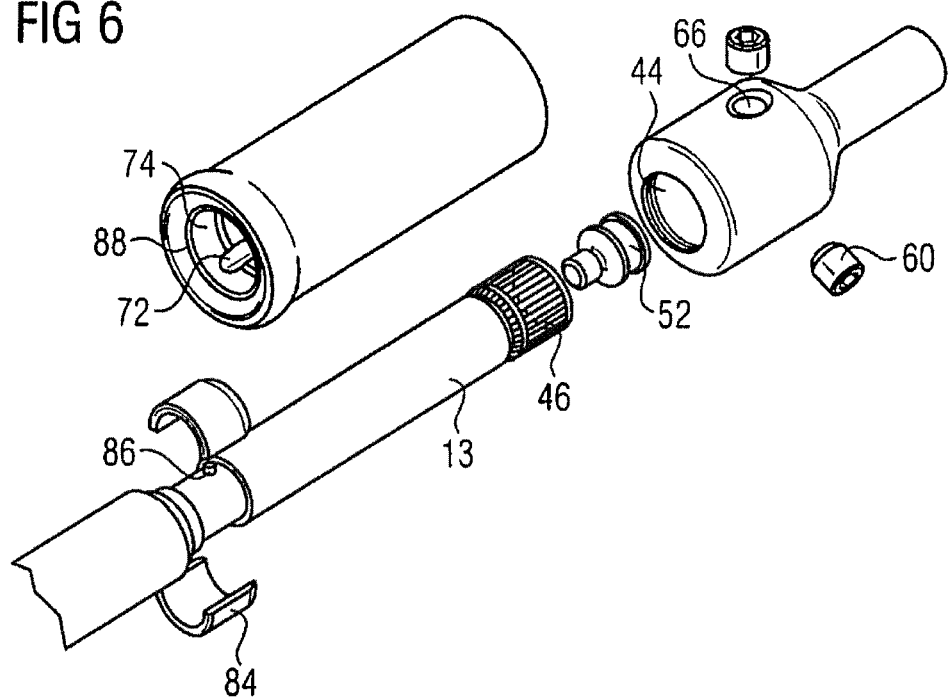
FIG. 6 is an exploded perspective view of an arrangement for mounting a conductive sleeve on a rear portion of the conductive core of the contact pin.

The front of the cable 12 is dressed so that a central conductor 40 thereof is exposed. The conductor 40 makes electrical connection with the conductive socket sleeve 20 by a crimp 42 provided at the rear of the sleeve 20. Further details of the conductive socket sleeve 20 and its electrical and mechanical connection to the rear end portion 11 are shown in FIGS. 4, 5 and 6.

The conductive socket sleeve 20 acts as a socket member receiving the rear end portion 11 of the conductive core 5 of the contact pin 6. At its front end the sleeve 20 has a socket 44 in which is received a conductive contact cage 46 which forms an electrical contact terminal for receiving the rear electrical contact surface 13 of the pin conductive core 5.

An axial bore 48 extends centrally into the rear of the conductive core 5 and is formed with a female thread 50. Screwed into the bore 48 is a mechanical shoe 52 so as to be mounted to the axial rear end of the rear end portion 11 of the conductive core 5. At its rear the shoe 52 has an engagement portion 58 with a wider diameter than the axial projection 54. The engagement portion 58 has a radially outwardly facing annular channel with which are engaged three grub screws 60. Each grub screw is formed with a male thread engaged with a female thread 64 formed in a respective radial passage in the socket member 20. Each grub screw 60 acts as a locking member by its engagement in the annular channel of the shoe 58. The socket member 20 is locked to the contact pin 6 by the shoe 52 acting as an intermediate member between the conductive core 5 and the locking members in the form of grub screws 60. This mechanical locking arrangement is disposed rearwardly of the region where the electrical connection is made between the conductive core 5 and the contact cage 46 in the socket member 20. Any fracturing or weakness caused to the mechanical connection need not therefore interfere with the current flow path via the conductive core 5, the conductive cage 46 and the socket 44.

Figure 7:
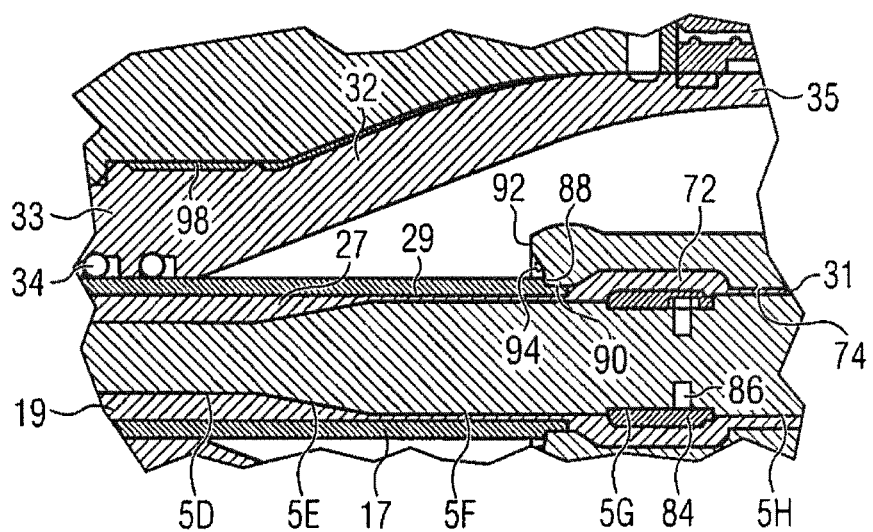
FIG. 7 is an enlarged view of part of FIG. 1 showing the conductive sleeve mounting arrangement and also an earth guiding arrangement.
Figure 8:
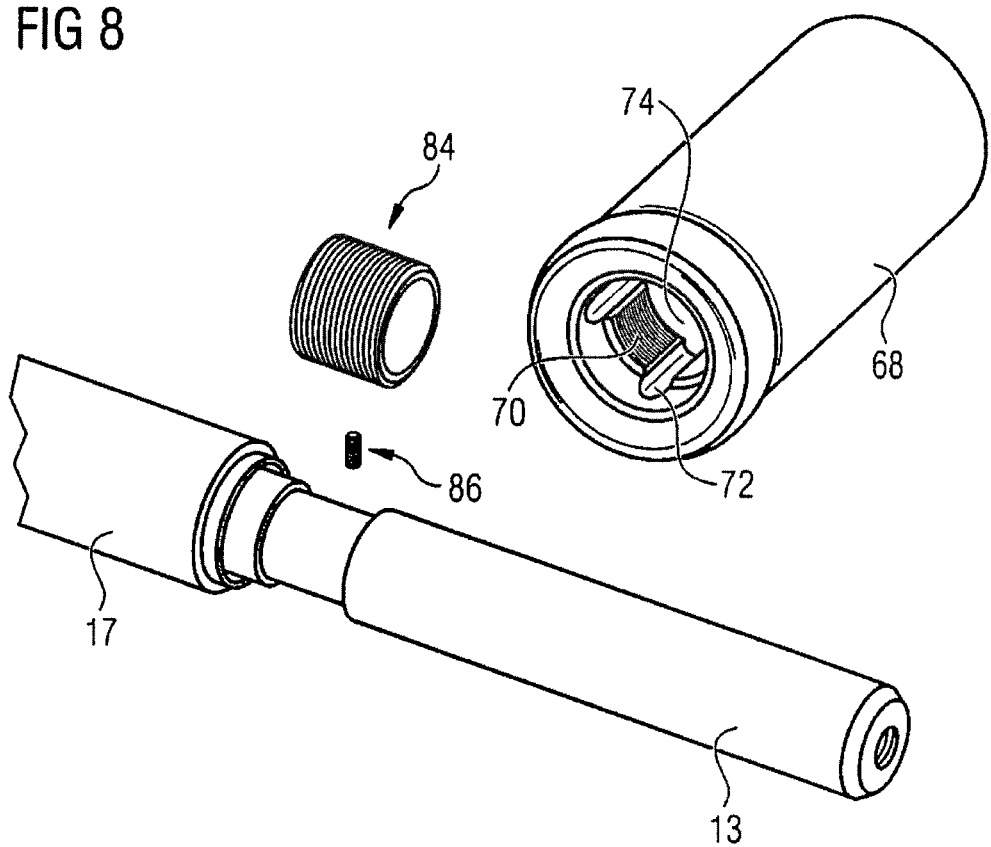
FIG. 8 is a perspective view of some of the components shown in FIG. 6.

In front of the electrical connection arrangement at the rear of the contact pin 5, there is provided a conductive sleeve 68, secured to the contact pin 2. Further details concerning the manner in which the conductive sleeve 68 is secured to the contact pin 2 are shown in FIGS. 6, 7 and 8.

Adjacent to its front end the conductive sleeve 68 is formed with an internal thread 70. A plurality of axial channels 72 are formed on the inner wall 74 of the sleeve 68 so as to interrupt the internal thread 70 at circumferential intervals and allow communication of flowable insulating material from in front of the sleeve 68 along its interior to an exit point 76 at its rear, as will be described in more detail below.

The contact pin 6 is provided with an axially extending annular insulation portion 15 around its conductive core 5. The annular insulation portion 15 extends from the front electrical contact surface 8 of the conductive core 5 to the radially outwardly facing electrical contact surface 13 at the rear of the pin. The annular insulation portion 15 includes, at least over part of its length, two layers. There is an insulating sleeve 17 and an inner insulating layer 19 which on its inside surface is in contact with the conductive core 5 and on its outside surface is in contact with the insulating sleeve 17. The insulating sleeve 17 is a prefabricated member which during assembly of the contact pin, is passed over the conductive core from rear to front. At its front it forms a seal with the conductive core by means of a pair of O-rings 23. At its rear the insulating sleeve 17 is engaged by the conductive sleeve 68.

The conductive core 5 is formed at its front end with a central axial bore 80 which is closed by a plug 82. Immediately to the rear of the front contact surface 13 of the conductive core 5, the conductive core has a seal holding portion 5A on which the O-ring seals 21 are provided. To the rear of the seal holder portion 5A a cylindrical portion 5B is provided. The cylindrical portion 5B has a diameter slightly smaller than the inside diameter of the insulating sleeve 17 in this region. Forwardly of the cylindrical portion 5B a plurality of radial passages 23 are formed to connect the axial bore 80 to the outside of the conductive core. An annular passage 25 is formed around the cylindrical portion 5B and inwardly of the insulating sleeve 17, by virtue of the difference in diameters of these components in this region. To the rear of the cylindrical portion 5B the conductive core has a conical portion 5C, reducing in diameter in the rearward direction. To the rear of conical portion 5C the conductive core 5 has a cylindrical portion 5D of relatively small diameter compared to other parts of the conductive core 5. Outwardly of the conical portion 5C and the cylindrical portion 5D there is an annular space 27 which is occupied by insulating material forming the inner insulating layer. To the rear of cylindrical portion 5D a second conical portion 5E is provided, increasing in diameter in the rearward direction to where it joins another cylindrical portion 5F. The cylindrical portion 5F has a diameter which is smaller than the insulating sleeve 17 thereby creating an annular passage between the outside of cylindrical portion 5F and the inside of sleeve 17.

As seen more clearly in FIG. 7, to the rear of cylindrical portion 5F the conductive core 5 is formed with an annular recess 5G. This has a diameter smaller than that of the cylindrical portion 5F. To the rear of the annular recess 5G the conductive core 5 has a rear cylindrical portion 5H. At the rear of portion 5H the radially outwardly facing electrical contact surface 13 is provided. The cylindrical portion 5H has a diameter slightly smaller than the inside diameter of the conductive sleeve 68 (described in more detail below), whereby an annular passage 31 is formed around the portion 5H.

The inner insulating layer 19 of the annular insulation portion is formed in the space 27 between reduced diameter portion 5D of the conductive core 5, as well as the conical portions 5C and 5E at the respective opposite ends of portion 5D, and the inside of the insulating sleeve 17. The conductive core has an intermediate portion between its front and rear end portions which includes the cylindrical portion 5D. Around portion 5D the inner insulating layer formed by the solidified flowable material is at its thickest.

A split collar 84 engages in the annular recess 5G of the conductive core 5. The split collar is formed with an external thread. It is non-rotationally secured with respect to the conductive core by a pair of radially arranged dowels 86. The conductive sleeve 68 is screwed onto the split collar 84 to adopt a position in which an annular abutment edge 88 at the front of the conductive sleeve is in engagement with an annular groove 90 at the rear of insulation sleeve 17. The abutment edge 88 is formed at an inner radius of the front of the sleeve 68. The sleeve 68 has a radially outer portion 92 disposed forwardly of the abutment edge 88. An annular surface 94 extends between the abutment edge 88 and the radially outer portion 92. The annular surface 94 is slanted with respect to the axial direction.

The outside diameter of the conductive sleeve 68 at its rear is substantially equal to the outside diameter of the socket member 20. In use both of these components will be at the same electric potential and by forming them both of substantially the same diameter condensation of the electric field lines in the region between the front of the socket member 20 and the rear of the sleeve 68 can be generally minimised, thereby reducing the risk of breakdown of the fill material occupying this part of inner chamber 18.

During manufacture of the contact pin 2, the insulating sleeve 17 is passed over the conductive core from rear to front. The front of the insulating sleeve 17 abuts against the wide diameter portion of the conductive core 5 which forms the electrical contact surface 13. The split collar 84 is laterally assembled onto annular recess 5G and secured against rotation by dowels 86. The conductive sleeve 68 is inserted over the rear of the conductive core and screwed into place. The annular abutment edge 88 at the front of the sleeve 68 engages with the rear of the insulating sleeve 17. The insulating sleeve 17 is thereby clamped between the sleeve 68 and the front end of the conductive core 5 where the contact surface 13 is formed. Flowable insulating material, such as a thermoplastic, is introduced into the contact pin via the bore 80 at its front end. The flowable material passes from the bore 80 via the radial passages 23 and along the annular passage 25 to the space 27. Once that space is occupied the flowable material continues along annular passage 29 and along axial passages 72 in the conductive sleeve 68. From there the flowable material passes along annular passage 31 until it reaches the exit point 76 from the sleeve 68. Normally this process is carried out with the contact pin held vertically with its front end lowermost. Thus the flowable material rises up the contact pin until eventually overflowing via exit point 76. Once the contact pin has been filled with the flowable material the plug 82 is put in place. The flowable material solidifies to form an inner layer 19 of the annular insulation portion.

The support 24 for the contact pin 5 is secured to the connector housing 2 by a screw threaded connection. The support is made of a conductive material, which in this embodiment is metallic. The outside of the insulating sleeve is bonded to an inner surface of the support 24. The support has a forwardly extending tubular portion 96 which acts as an electrically conductive earth shield around the annular insulation portion formed by insulating sleeve 17 and inner insulating layer 19. At its rear the support 24 is generally cup shaped. It has a cylindrical cavity 98 which is screw threaded to provide a connection to the earth guide member 32. The earth guide member 32 extends rearwardly from a front portion 33 thereof where it is sealed by O-ring seals 34 to the insulating sleeve 17 to a rear portion 35. The front portion 33 is disposed radially outwardly of the cylindrical portion 5D of the conductive core 5. The rear portion 35 is disposed radially outwardly of the conductive sleeve 68. The earth guide member 32 is generally conical, increasing in diameter from the front portion to the rear portion. Its profile in axial cross section is generally straight as it extends away from the contact pin, then becoming concave towards the rear.

It is to be noted that the region of the conductive core 5 of the contact pin where it increases from a small diameter to a large diameter, namely conical portion 5E, is disposed radially inwardly of where the earth guide member is increasing in diameter in the rearward direction. A certain radial thickness of annular insulation is provided around conductive core portion 5D so that the electric stress between the core, which in use will be at a high voltage, and the support 24, which in use will be at earth, is below an allowable level. As the electric field between the core and the earth "brakes out" from the annular insulation of the contact pin itself, in the rear part of inner chamber 18 occupied by fill material, it is important to control the profile of the electric stress. The increasing diameter of the earth guide 32 in the rearward direction in the region where the contact pin enters the chamber 18 allows the conductive core 5 to increase in diameter, without an undesirable increase in electric stress.

Another area where care in the design of the embodiment has been taken in relation to electrical stress considerations is at the front end of the conductive sleeve 68. At this point there is the potential for the fill material occupying inner chamber 18 to leave small pockets of trapped air. For example, air may be caught between the abutment edge 88 of sleeve 68 and the annular recess 90 at the rear of insulating sleeve 17. By providing radially outer portion 92 of sleeve 68 forwardly of this abutment region, the region is cloaked from changes in electrical potential.

In addition, the region around the abutment edge 88 is radially inward of the earth guide 32 where it is increasing in diameter and this arrangement also serves to control the electric stress gradient.

In use, it is possible that the outer chamber 14 may experience ingress of water, for example if there is failure of the gland 16 or the seals at its respective front and rear ends. The effect of this is that earth potential radially outwardly of the rear of the contact pin, including the conductive sleeve 68, moves from the gland 16 to the flexible wall 26. The earth guide 32 can effectively shield the part of inner chamber 18 radially inwardly of the earth guide and so can control the electric stress even if the position of earth potential changes as a result of such a failure or partial failure.

There will now be described the housing attaching arrangement 110 for attaching together the cable termination chamber housing 10 and the contact pin housing 4. Whilst this is described primarily with reference to FIGS. 1, 2 and 3, a similar arrangement 110 is used to attach the cable termination chamber housing 10 shown in FIG. 9 to the plug connector housing 3.

The cable termination chamber housing 10 is formed near to its front end with an attachment portion in the form of a flange 81. The contact pin housing is formed near to its rear end with an annular recess 83. An attachment flange 85 is provided in four parts 87, each of which each extends in the circumferential direction around one quarter of a circle. Each flange part 87 is provided adjacent to its opposite ends in the circumferential direction with a respective radial bolt hole 89. Corresponding bolt holes 91 are provided in the wall of the contact pin housing 4 at intervals in the circumferential direction. A pair of radial bolts 95 is provided for bolting each flange part 87 to the contact pin housing 4 via the bolt holes 89 and 91. The bolt holes 91 in the housing 4 extend radially inwardly from the bottom of the annular recess 83. Projecting radially outwardly from the recess 83 four dowel pins 93 are provided. Each dowel pin 93 is positioned so that it will engage in a corresponding radial bore (not shown) of a respective flange part 87. Since only one dowel pin 93 is provided per flange part 87, the flange part can be moved radially into engagement with the contact pin housing 4, with a radially inwardly projecting portion 97 of the flange part 87 engaging in the annular recess 83 of the housing.

Each flange part 87 is formed with a pair of axially extending bolt holes 99 for receiving corresponding axial bolts 101. The flange 81 of the cable termination chamber housing 10 is provided with corresponding bolt holes 103 for receiving the bolts 101. The bolts 101 are used to secure the flange parts 87 to the flange 81, thereby securely connecting together the contact pin housing 4 and the cable termination chamber housing 10. The dowel pins 93 ensure torsional strength and rigidity of the connecting arrangement.

Prior to connecting housings 4 and 10 together, the housing 4 may be connected to another structure. This may be done by passing a flange over the contact pin housing 4, from rear to front. The axial profile of the housing is minimised by there being no attachment flange present at this stage. The flange for connecting to another structure may for example be positioned against shoulder 105 towards the front of the housing.

What is claimed is:

1. An underwater electrical connection assembly comprising:
a contact pin comprising an axially extending conductive core with a front portion having a front electrical contact surface and a rear portion having a rear electrical contact surface, and an annular insulation portion around said conductive core extending axially rearwardly from the front portion of the conductive core, the annular insulation portion comprising an insulating sleeve;
a collar mounted on the conductive core forwardly of the rear electrical contact surface thereof, the collar being axially split and having a radially outer threaded surface; and
a conductive sleeve having a radially inner threaded surface in engagement with the radially outer threaded surface of the collar so as to mount the conductive sleeve on the conductive core, the mounted conductive sleeve clamping the insulating sleeve between the conductive sleeve and the front electrical contact surface.

2. An assembly of claim 1, wherein the rear portion of the conductive core, at least where the rear electrical contact surface is provided, has a diameter which is larger than that of a part of the conductive core forwardly of the collar.

3. An assembly of claim 1, wherein the conductive sleeve engages with the annular insulation portion.

4. An assembly of claim 1, wherein the conductive sleeve extends forwardly of the collar.

5. An assembly of claim 1, wherein the conductive sleeve extends rearwardly of the collar.

6. An assembly of claim 1, wherein the collar is received in an annular recess around the rear portion of the conductive core.

7. An assembly of claim 1, comprising an alignment dowel extending radially between the conductive core and the collar.

8. An assembly of claim 1, wherein the conductive sleeve has an abutment surface in engagement with the annular insulation portion, and a radially outer portion disposed radially outwardly and forwardly of the abutment surface.

9. An assembly of claim 1, comprising an axial channel extending from the front of the engaged radially inner and radially outer threaded surfaces to the rear thereof.

10. An assembly of claim 9, wherein the axial channel is formed in the conductive sleeve.

11. An underwater electrical connection assembly comprising:
- a contact pin comprising an axially extending conductive core with front and rear portions each having a respective electrical contact surface, and an annular insulation portion around said conductive core extending axially rearwardly from the front portion of the conductive core; and
- a conductive sleeve mounted on the rear portion of the conductive core, the conductive sleeve having an abutment surface in engagement with the annular insulation portion, and a radially outer portion disposed radially outwardly and forwardly of the abutment surface, the forwardly disposed radially outer portion protecting from electric stress a region where the abutment surface is in engagement with the annular insulation portion.

12. An assembly of claim 11, wherein the conductive sleeve has an annular surface which is slanted with respect to the axial direction, and which extends radially outwardly from the abutment surface to the radially outer portion.

13. An assembly of claim 11, wherein insulating material is provided in a region rearwardly of the abutment surface.

14. An underwater electrical connection assembly comprising:
- a contact pin comprising an axially extending conductive core with front and rear portions each having a respective electrical contact surface, and an annular insulation portion around said conductive core extending axially rearwardly from the front portion of the conductive core;
- a chamber containing insulating fill material which surrounds the annular insulation portion of the contact pin where it extends axially rearwardly from a first axial position;
- an earth guide member extending rearwardly from said first axial position to a second axial position rearward of the first axial position, said earth guide member extending rearwardly from adjacent to the annular insulation portion at said first axial position to radially outward of said annular insulation portion at said second axial position; and
- a conductive sleeve mounted on the rear portion of the conductive core, the conductive sleeve extending forwardly to a position radially inwardly of the earth guide member.

15. An assembly of claim 14, wherein the earth guide member is substantially conical.

16. An assembly of claim 14, wherein, as viewed in axial cross section, at least a part of the earth guide member has a profile which is concave.

17. An assembly of claim 14, wherein the rear of the earth guide member is sealingly connected to a gland member around the insulating fill material.

18. An assembly of claim 14, comprising a fill opening for the introduction of fill material to the chamber.

19. An assembly of claim 14, comprising a second chamber outward of the first mentioned chamber and containing fill material.

20. An assembly of claim 14, comprising a conductive sleeve mounted on the rear portion of the conductive core, the conductive sleeve extending forwardly to a position radially inwardly of the earth guide member.

21. An assembly of claim 14, wherein the conductive core has a portion of increasing diameter in the rearward direction, this portion being located radially inwardly of the earth guide member.

22. A termination assembly for an underwater cable, comprising:
- a pin having an axially extending conductive core and an axially extending annular insulation portion around said conductive core;
- a conductive socket member for making an electrical connection with a conductor of an underwater cable and having a front socket, the front socket receiving a rear end portion of the conductive core of the pin;
- an electrical contact terminal in the front socket making electrical contact with said rear end portion; and
- a locking member for locking said rear end portion in the front socket, the locking member being disposed rearwardly of the electrical contact terminal;
- wherein said locking member engages an intermediate member which is mounted on the conductive core of the pin.

23. A termination assembly of claim 22, wherein said intermediate member has an annular channel for receiving the locking member.

24. A termination assembly of claim 22, wherein said intermediate member is mounted to an axial rear end of the rear end portion of the conductive core.

25. A termination assembly of claim 24, wherein said intermediate member has an axial projection extending into an axial socket in the rear end portion of the conductive core.

26. A termination assembly of claim 25, wherein said intermediate member has an engagement portion for engagement by the locking member, the engagement portion having a diameter wider than the diameter of the axial projection.

27. A termination assembly for an underwater cable, comprising:
- a pin having an axially extending conductive core and an axially extending annular insulation portion around said conductive core;
- a conductive socket member for making an electrical connection with a conductor of an underwater cable and having a front socket, the front socket receiving a rear end portion of the conductive core of the pin;
- an electrical contact terminal in the front socket making electrical contact with said rear end portion; and
- a locking member for locking said rear end portion in the front socket, the locking member being disposed rearwardly of the electrical contact terminal;
- wherein said locking member engages an intermediate member which is mounted on the conductive core of the pin; and
- wherein said intermediate member is screw mounted on the conductive core of the pin.

* * * * *